No. 779,634.

Patented January 10, 1905.

UNITED STATES PATENT OFFICE.

SAMUEL W. ALLEN, OF PECK, IDAHO.

POISON FOR RODENTS.

SPECIFICATION forming part of Letters Patent No. 779,634, dated January 10, 1905.

Application filed May 25, 1904. Serial No. 209,748.

*To all whom it may concern:*

Be it known that I, SAMUEL W. ALLEN, a citizen of the United States, residing at Peck, in the county of Nez Perces and State of Idaho, have invented certain new and useful Improvements in Poisons, of which the following is a specification.

This invention provides a composition for the extermination of rodents which are destructive to crops and are prone to burrow.

In preparing the poison the following ingredients are mixed in about the proportions stated—*i. e.*, bisulfid of carbon, three gallons; carbolic acid, one gallon; Cayenne pepper, one pound. The ingredients are mixed and allowed to stand for about twenty-four hours, after which the liquid is drawn off or strained to separate it from the solid matter and is then bottled for use.

A piece of cotton, cloth, or other absorbent material is saturated with the preparation and is placed in the opening or other spots frequented by the rodents or animals and is efficacious in ridding the locality of their presence.

Having thus described the invention, what is claimed as new is—

The poison comprising bisulfid of carbon, carbolic acid and Cayenne pepper in about the proportions specified.

In testimony whereof I affix my signature in presence of two witnesses.

SAMUEL W. ALLEN. [L. S.]

Witnesses:
  ROBERT SEEGER,
  EDWARD H. GAIRLEY.